Nov. 19, 1946.  G. H. LEE  2,411,439
BRAZING, SOLDERING, OR THE LIKE PROCESS
Filed June 9, 1944
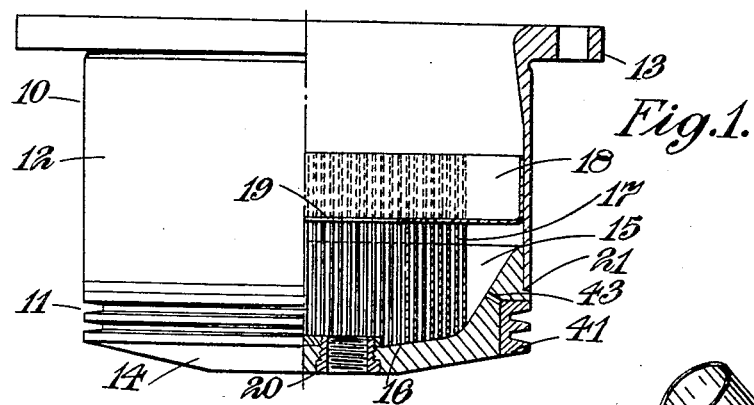
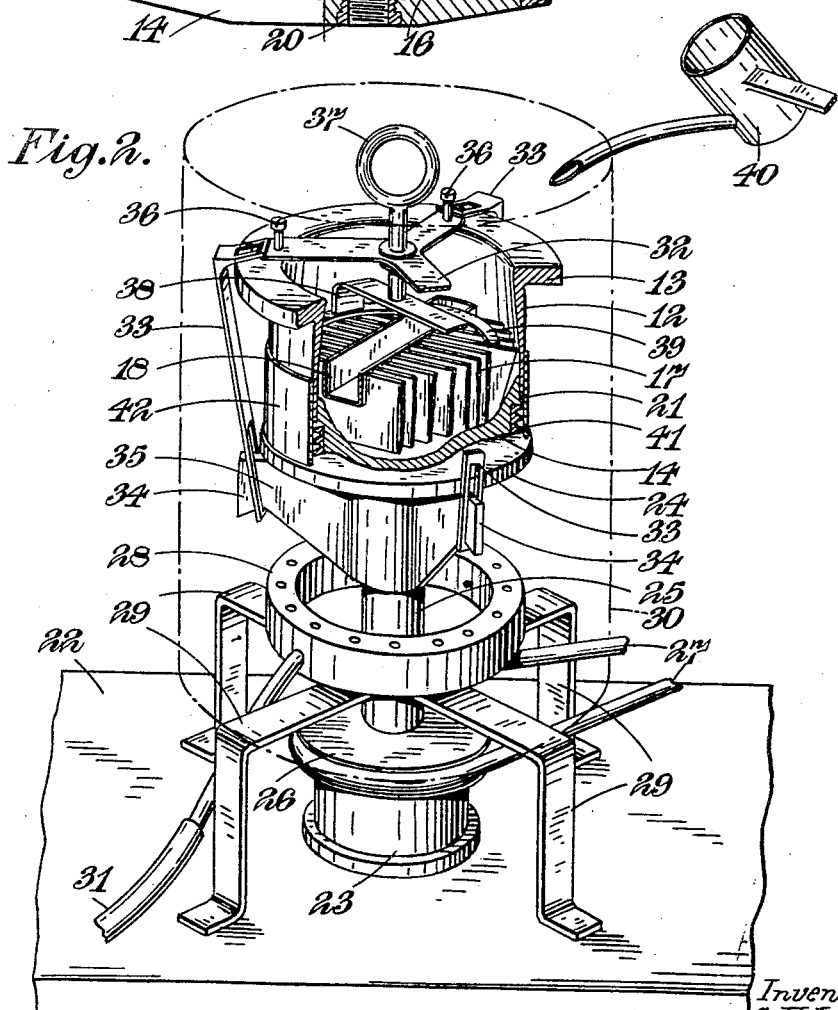
Inventor
G. H. Lee
by Wilkinson & Mawhinney
Attorneys Patented Nov. 19, 1946

2,411,439

UNITED STATES PATENT OFFICE 2,411,439

BRAZING, SOLDERING, OR THE LIKE PROCESS

George Herbert Lee, Bristol, England, assignor to The Bristol Aeroplane Company Limited, Bristol, England, a British company Application June 9, 1944, Serial No. 539,577
In Great Britain April 6, 1943

1 Claim. (Cl. 113—112)

This invention concerns improvements in or relating to brazing, soldering or the like processes.

According to the present invention a brazing, soldering or the like process is characterised in that the parts to be united by the process are rotated together whilst the brazing, soldering, or the like material is in a molten condition whereby said material is caused to flow over said parts by centrifugal action.

According to another feature of the present invention the process is characterised in that the parts to be united by the process are rotated together at a varying speed whilst the brazing, soldering or the like material is in a molten condition whereby said material is caused to ebb and flow over said parts.

The invention has particular application to the production of the base of a junk-head of a sleeve-valve internal combustion engine. Accordingly in order that the invention may be clearly understood, the production of such a junk-head will now be described, merely by way of example, with reference to the accompanying drawing whereon:

Figure 1 is a side elevation of a junk-head which has been produced by a process in accordance with the invention, the head being shown partly in section, and Figure 2 is a perspective view of an apparatus for carrying out said process.

Referring to Figure 1, the junk-head 10 is of two-piece construction—one part thereof is a base 11 and the other part is a steel sleeve 12 to which the base 11 is attached and which is itself secured to the cylinder by studs passing through the flange 13.

The base 11 comprises a plate 14, one face 15 of which is dish-shaped with a generally flat central portion 16, and a plurality of fins 17 secured by brazing to the face 15 and the inner surface of sleeve 12. The fins 17 are approximately of a corresponding configuration to the face 15 to which they are attached.

The fins, which are pre-formed, are made to be a loose fit with the inclined wall of face 15 and the brazed joint is of such a depth that complete contact between the lower edge of the fin and the inclined wall is ensured. Whilst the fins can be readily machined to be in more intimate contact with the flat central portion than with the inclined wall it is desirable that this brazed joint should also be of a considerable depth to ensure complete contact. By providing this form of brazed joint it is unnecessary to machine the fins with special care to provide for their varying edge shape as would be required if intimate contact between the fins 17 and the face 15 was required: this simplifies the production of the fins and their assembly on the base.

The upper edges of the fins 17 are secured to a tray 18 which lies transversely of the fins. The tray has a central opening 19 to permit spark plugs to be passed down into the head and screwed into the spark-plug adaptors 20 which are carried in the plate 14. The adaptors are screwed into the plate and then brazed in. The fins 17 extend parallel to each other and chordwise across the sleeve. To enable the spark plugs to pass downwardly to the adaptors 20, those fins which would otherwise extend across the spark-plug holes are terminated at the edge thereof. There is thus formed a tunnel through which the plugs pass when being fitted to the head.

The base 11 is received by the steel sleeve 12, a spigot joint 21 being provided by extending the inclined wall of the face 15 upwardly within the sleeve. The base 11 is brazed to the sleeve at the spigot joint 21.

The fins 17 are brazed to the face 15, the adaptors 20 into the base 11, and the latter to the sleeve 12 by a single brazing operation. In preparation for this operation the following treatments are carried out on the separate parts:

1. The adaptors 20 are coated with a flux and are then screwed into the plate 14. The face 15 of the base is brushed with a solution of the flux in water and finally a similar treatment is applied to the face of the spigot joint 21 for the base.

2. The steel sleeve 12 is coated with a brazing material by dipping the sleeve into a bath, the outside surface being protected by a heat resistant cement. To ensure adhesion of the brazing material, the inside and lower edge of the sleeve 12 is brushed with flux. The sleeve is dipped in the bath of molten brazing material to a depth greater than the height of the fins on assembly. When the sleeve has attained the temperature of the bath and the coating is complete it is removed and allowed to cool. The excess brazing material is removed from the sleeve so that finally a thin continuous coat is left on the inner surface and lower edge of the sleeve.

3. The edges of the fins 17 (which fins are attached to the tray 18 so as to form a pack) are not previously coated with flux in preparation for the brazing operation.

The base plate 14, sleeve 12, and the pack of fins are then assembled. The pack of fins is first placed upon the face 15 of the plate 14 (ensuring that the fins are properly positioned relative to the plug adaptors) and then the steel sleeve 12 is spigoted on to the plate 14. A retaining band 42 is then placed in position on the outer cylindrical surface of the head so that it encircles the plate 14 and sleeve 12 to the same height as the fins 17. The purpose of this band is to seal the spigot joint 21 so that during brazing the molten brazing material is unable to leak through the joint under the centrifugal force to which it is subjected.

The various parts having been treated and assembled as described above, the brazing operation is now performed.

The apparatus which is provided for this purpose is shown in Figure 2 and comprises base plate 22, a pedestal bearing 23 carried by the base plate, a rotatable platform 24 supported from the bearing 23 by the shaft 25, a pulley 26 which is suitably driven by a belt 27 so as to rotate the platform 24, a gas burner 28 disposed below the platform 24 and supported upon legs 29, and a cylindrical shield 30 which rests upon the legs 29 and envelops the gas burner, the platform and the head assembly. Gas passes to the burner 28 by a pipe 31. The pulley 26 is driven from an electric motor (not shown) by belt 27, the arrangement being that the speed of said motor is variable to vary the speed of rotation of the platform 24.

The head assembly in preparation for the brazing operation is mounted on platform 24 and clamped in position thereon. The clamping means provided is shown in Figure 2 and comprises a spider 32 which extends across the flange-end of the sleeve 12, arms 33 which engage the spider 32 and the lugs 34 of the platform support 35, and bolts 36 which are capable of engaging the flange 13 of sleeve 12. When the bolts 36 are tightened down the clamping means described serves a dual function of clamping the head assembly to the platform 24 and of forcing the sleeve 12 into intimate contact with plate 14 at the spigot joint 21.

It is also necessary to press the pack of fins 17 into contact with the face 15 of the plate 14 and to prevent relative movement between said pack and the plate during rotation of the platform 24. To this end a turn-bolt 37, which is threaded in the boss of the spider 32, engages a stirrup 38 whose ends rest upon a ring 39 that lies upon the upper edge of the pack of fins. When the bolt 37 is screwed downwardly upon the stirrup 38 the latter forces the ring 39 against the pack of fins thereby clamping the latter in proper relationship upon the plate 14.

The head assembly having been clamped in position on the platform 24 as described a quantity of the flux dissolved in water is poured into the head assembly. The gas burner 28 is lit, the shield 30 placed in position so that hot material within the head assembly is incapable of being thrown out against the operator, and the electric motor is started up. During the heating of the head assembly the speed of rotation of the platform 24 is varied continuously in order to cause the flux to wash over all the surfaces of the parts to be brazed.

The heat of the ring 28 is adjusted so that the time required for the head to reach the brazing temperature (approximately 730° C.) is about ten minutes.

Whilst the head assembly is being heated up as indicated, a quantity of the brazing material is melted in an iron pot 40 which, as shown in Figure 2, is provided with a spout for pouring the molten material from the bottom of the pot. When the head has reached the required temperature (which is indicated to the operator by the melting of a small strip of the brazing material lying upon the portion 16 of the face 15) the platform 24 is brought to rest and the contents of the pot 40 are poured into the head assembly. The molten brazing material is poured on to the plug adaptors 20 and over the joints between the tray 18 and the fins 17. When the contents of the pot 40 have been introduced to the head assembly the electric motor is started and during the subsequent two minutes the assembly is twice speeded up from rest to the maximum speed of 350 R. P. M.—at which the molten brazing material reaches the top of the fins.

When the second speeding up of the platform 24 has been accomplished the speed of the platform is reduced to 150 R. P. M. and the burner 28 is extinguished. The speed is maintained until the temperature of the head assembly has fallen well below the melting point of the brazing material. The head is then slowly cooled in air.

In order to clean the inside of the head and to remove excess flux the whole of the inside surface of the sleeve 12, face 15 and the fins 17 are washed with dilute nitric acid and then with water to remove the acid.

In order to relieve any stresses introduced into the head during cooling from the brazing temperature the finished head is subjected to a heat treatment at 450° C. for one hour.

It will have been understood from the above description of the brazing operation that the adaptors 20 are secured to the plate 14, that the sleeve 12 and plate 14 are united at the spigot joint 21 and that the fins 17 are attached to the faces 15, 16 and the inner surface of the sleeve 12 in a single brazing operation. By varying the speed of rotation of the platform 24 whilst the brazing material is in a molten condition the brazing material is made to flow over the surfaces 15, 16. Moreover, by selecting a suitable speed of rotation for the platform 24 whilst the brazing material is solidifying, a predetermined depth of brazing material is provided over the surfaces 15 and 16. The depth of this layer of material is such that complete contact is ensured between the fins 17 and face 15.

It will be noted from Figure 1 that the rings which are commonly provided to form a seal between the head 10 and the sleeve-valve are adapted to be carried by a member 41. This ring carrier, which is of cast iron, is provided because of the poor wearing qualities which the base plate 14 possesses when this is produced from copper or a copper alloy.

The carrier 41 may be shrunk upon the plate 14 or alternatively shrunk and brazed thereon.

When it is proposed to shrink and braze the carrier 41 to the plate 14, a number of holes 43 are drilled from the inclined portion of face 15 to the stepped portion thereof which receives the carrier 41, these holes being placed around the periphery of the plate 14. The cast iron carrier is dipped in a bath of molten brazing material so that the latter coats the surface thereof which will engage with the plate 14. The other surfaces are protected from the molten material by a coating of heat resistant cement. The coated carrier 41 is slowly cooled in air and then the excess brazing material is removed so that its diametral dimension will provide an interference fit with the plate 14. The carrier 41 is then washed with flux, heated and shrunk on to the plate 14. The head assembly with the carrier 41 is then mounted upon the platform 24 and the brazing operation described above performed. The retaining band 42 previously referred to is provided to cover the joint between the carrier 41 and the plate 14 and the spigot joint 21 so that the molten brazing material is unable to escape through these two joints.

It is to be understood that although in the embodiment described the parts to be brazed together are rotated about a vertical axis, this may in certain cases be done about a horizontal or other axis dependent upon the construction of the parts to be joined.

I claim:

A brazing process for simultaneously uniting a plurality of cooling fins to the base of a junkhead of a sleeve-valve internal combustion engine and the base to a tubular wall of the head comprising assembling the fins to the base and the base to the wall, introducing a flux to the assembled head, heating the assembled head and simultaneously rotating it to wash the adjoining faces of the fins and the base and of the base and the wall, introducing a brazing material to the head, rotating the latter at a varying speed whilst continuing to heat the head to cause the molten material to flow over the junction of the fins and the base and of the base and the wall, cooling the head, and controlling the speed of rotation during the cooling step to determine the form of the brazing joint between the fins and the base and between the base and the tubular wall.

GEORGE HERBERT LEE.